(12) United States Patent
Liu et al.

(10) Patent No.: US 10,692,028 B2
(45) Date of Patent: Jun. 23, 2020

(54) OPTIMAL DEMAND-BASED ALLOCATION

(71) Applicant: SAP SE, Walldorf (DE)

(72) Inventors: Jing Liu, Nanjing (CN); Zhongcun Wang, Nanjing (CN); Daihui Zhu, Nanjing (CN); Frank Spruenken, Karlsruhe (DE); Yongxun Li, Shanghai (CN); Qiwei Zhang, Shanghai (CN); Ye Jin, Shanghai (CN)

(73) Assignee: SAP SE, Walldorf (DE)

(*) Notice: Subject to any disclaimer, the term of this patent is extended or adjusted under 35 U.S.C. 154(b) by 857 days.

(21) Appl. No.: 14/963,262

(22) Filed: Dec. 9, 2015

(65) Prior Publication Data
US 2017/0169377 A1 Jun. 15, 2017

(51) Int. Cl.
*G06Q 10/06* (2012.01)
*G06Q 50/30* (2012.01)
*G06F 16/28* (2019.01)

(52) U.S. Cl.
CPC ..... *G06Q 10/06315* (2013.01); *G06F 16/285* (2019.01); *G06Q 50/30* (2013.01)

(58) Field of Classification Search
None
See application file for complete search history.

(56) References Cited

U.S. PATENT DOCUMENTS 6,317,720 B1* 11/2001 Murakami ............ G06Q 10/02
705/13
8,792,905 B1* 7/2014 Li ........................ H04W 4/029
455/456.1

2001/0037174 A1* 11/2001 Dickerson ............. G07B 15/00
701/400
2010/0287073 A1* 11/2010 Kocis ............... G06Q 10/08355
705/28
2010/0299177 A1* 11/2010 Buczkowski .......... G06Q 50/30
705/7.13

(Continued)

FOREIGN PATENT DOCUMENTS

CN 102637359 A 8/2012
CN 103295394 A 9/2013
(Continued)

OTHER PUBLICATIONS

Yang et al., "Clustering Daily Metro Origin-Destination Matrix in Shenzhen China", Applied Mechanics and Materials vol. 743 (2015) pp. 422-432 (Year: 2015).*

(Continued)

*Primary Examiner* — Patricia H Munson
*Assistant Examiner* — Sarjit S Bains
(74) *Attorney, Agent, or Firm* — Jones Day

(57) ABSTRACT

Described herein is a framework for optimal demand-based allocation. In accordance with one aspect of the framework, trip data is extracted from vehicle operation data received from one or more vehicle data devices servicing a region of interest. Vehicle demands for multiple tiles of the region of interest and mutual travel times between neighboring tiles are estimated based at least in part on the trip data. A set of candidate tiles for allocating vehicle stations may then be determined by minimizing total travel time based on the mutual travel times and vehicle demands.

18 Claims, 7 Drawing Sheets

(56) References Cited

U.S. PATENT DOCUMENTS

| | | | | |
|---|---|---|---|---|
| 2012/0173136 | A1* | 7/2012 | Ghoting | G01C 21/3453 |
| | | | | 701/411 |
| 2014/0089036 | A1* | 3/2014 | Chidlovskii | G06Q 10/06 |
| | | | | 705/7.27 |
| 2016/0209220 | A1* | 7/2016 | Laetz | G06Q 10/02 |
| 2016/0224945 | A1* | 8/2016 | Cogill | G06Q 10/02 |
| 2016/0247106 | A1* | 8/2016 | Dalloro | G06Q 10/06313 |
| 2016/0247247 | A1* | 8/2016 | Scicluna | G06F 17/3087 |
| 2017/0059336 | A1* | 3/2017 | Huang | G01C 21/343 |
| 2017/0068917 | A1* | 3/2017 | Rackley | G06Q 10/06313 |
| 2017/0109764 | A1* | 4/2017 | Tripathi | G06Q 30/0202 |
| 2017/0300049 | A1* | 10/2017 | Seally | G06Q 10/047 |
| 2018/0342034 | A1* | 11/2018 | Kislovskiy | G06Q 50/30 |

FOREIGN PATENT DOCUMENTS

| | | |
|---|---|---|
| CN | 103854472 A | 6/2014 |
| JP | 2003162567 A | 6/2003 |
| JP | 2013101577 A | 5/2013 |
| JP | 5744966 B2 | 7/2015 |

OTHER PUBLICATIONS

Tanizaki, "Optimum Allocation Method of Standby Taxi Vehicles at Taxi Stands", in APMS 2013, Part II, IFIP (International Federation for Information Processing) AICT 415, pp. 3-10, 2013, Eds.: V. Prabhu, M. Taisch, and D. Kiritsis (Year: 2013).*

Elhorst et al., "Forecasting the impact of transport improvements on commuting and residential choice", Journal of Geographical Systems vol. 8 (1), pp. 39-59 (Mar. 2006) (Year: 2006).*

Takashi Tanizaki, Optimum Allocation Method of Standby Taxi Vehicles at Taxi Stands, Advances in Production Management Systems, 2013, pp. 3-10, IFIP International Federation for Information Processing.

Brendan J. Frey et al., Clustering by Passing Messages Between Data Points, www.sciencemag.org, Feb. 2007, pp. 972-976, vol. 315, Science.

Anwar et al., "ChangiNOW: A Mobile Application for Efficient Taxi Allocation at Airports," Proceedings of the 16th International IEEE Annual Conference on Intelligent Transportation Systems (ITSC 2013), The Hague, The Netherlands, Oct. 6-9, 2013, pp. 694-701.

* cited by examiner

| DEVID | LONGITUDE | LATITUDE | GPS_TIME | PASSENGER_STATE |
|---|---|---|---|---|
| 1051847361 | 118.726143 | 32.059431 | Nov 29, 2011 7:28:02.0 AM | 0 |
| 1051847361 | 118.726138 | 32.059438 | Nov 29, 2011 7:28:32.0 AM | 0 |
| 1051847361 | 118.726174 | 32.059449 | Nov 29, 2011 7:29:02.0 AM | 0 |
| 1051847361 | 118.726164 | 32.05944 | Nov 29, 2011 7:29:32.0 AM | 0 |
| 1051847361 | 118.726254 | 32.05946 | Nov 29, 2011 7:29:44.0 AM | 1 |
| 1051847361 | 118.72688 | 32.059524 | Nov 29, 2011 7:30:02.0 AM | 1 |
| 1051847361 | 118.727366 | 32.059586 | Nov 29, 2011 7:30:32.0 AM | 1 |
| 1051847361 | 118.731701 | 32.059857 | Nov 29, 2011 7:33:02.0 AM | 1 |

*Fig. 3a*

| NAME | COMMENT |
|---|---|
| DEVID | Identification for a taxi |
| LONGITUDE/LATITUDE | GPS Location |
| GPS_TIME | Record Time |
| PASSENGER_STATE | Passenger Onboard Status (0: No 1: Yes) |

*Fig. 3b*

OPTIMAL DEMAND-BASED ALLOCATION

TECHNICAL FIELD

The present disclosure relates generally to computer systems, and more specifically, to a framework for facilitating optimal demand-based allocation.

BACKGROUND

Most taxi companies deliver taxies upon requests from customers either by telephones, mobile applications (or apps) or the Internet. They typically face the problem of how to place taxi stands (or stations) and allocate standby taxies while minimizing operational cost and maintaining satisfactory response time. Smart city planners are also interested in knowing how the optimal configuration of such public resources as taxi stands can benefit the overall population.

Optimal allocation of taxi stations and standby taxies can be especially difficult when the region for planning is the entire city. One reason is that it is often hard to collect enough information about real-time taxi demand and traffic conditions within the whole city region. Therefore, the optimization "objective" is hardly defined. Another reason is because optimal allocation of taxi stations consists of choosing an optimal configuration of locations, within the city, from many possible configurations. Such problem has proven to be non-deterministic polynomial-time (NP) hard. Conventional methods often rely on linear programming, which is computationally expensive, particularly when the problem size is as large as a city region.

Therefore, there is a need for an improved framework that addresses the above-mentioned challenges.

SUMMARY

A framework for optimal demand-based allocation is described herein. In accordance with one aspect of the framework, trip data is extracted from vehicle operation data received from one or more vehicle data devices servicing a region of interest. Vehicle demands for multiple tiles of the region of interest and mutual travel times between neighboring tiles are estimated based at least in part on the trip data. A set of candidate tiles for allocating vehicle stations may then be determined by minimizing total travel time based on the mutual travel times and vehicle demands.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 3a shows exemplary data records in vehicle operation data;

FIG. 3b shows an exemplary data structure of a vehicle operation data record;

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

One aspect of the framework described herein facilitates optimal allocation of vehicle stations and/or standby vehicles. A sample set of vehicle operation data may be used to characterize vehicle demands and traffic conditions within the region of interest, such as the entire city. A modified fast clustering procedure may then be used to determine the optimal allocation of vehicle station (or stand) locations, while minimizing the total travel time from all stations to the respective destinations. In addition, the optimal number of standby vehicles at each station may be determined given a station configuration. This advantageously enables operators (e.g., taxi companies) to provide on-demand transportation (e.g., taxis) in a timely manner. These and other advantages and features will be described in more detailed herein.

It should be appreciated that the framework described herein may be implemented as a method, a computer-controlled apparatus, a computer process, a computing system, or as an article of manufacture such as a computer-usable medium. These and various other features will be apparent from the following description.

Figure 1:
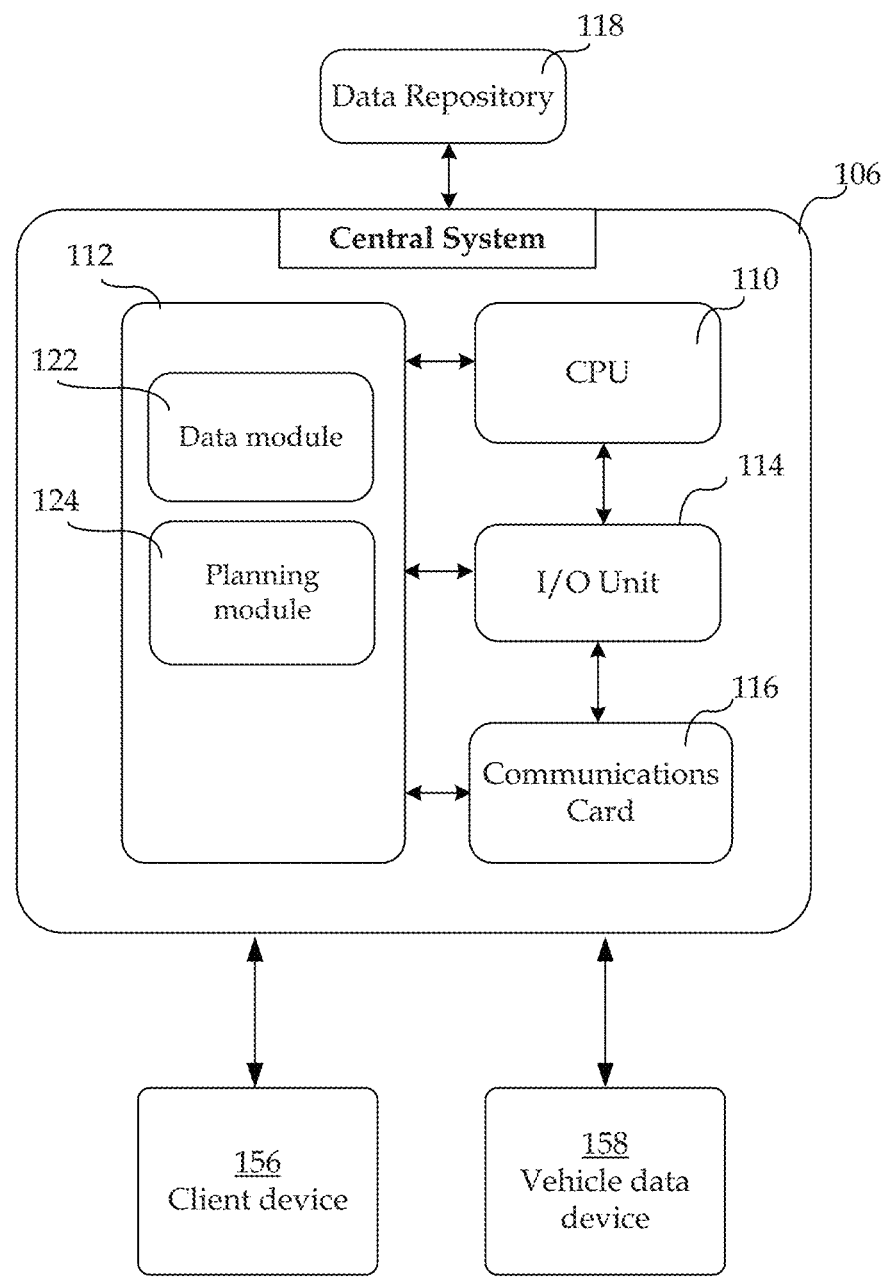
FIG. 1 is a block diagram illustrating an exemplary architecture.

FIG. 1 is a block diagram illustrating an exemplary architecture 100 that may be used to implement the framework described herein. Generally, architecture 100 may include a central computer system 106, a client device 156 and a vehicle data device 158. It should be appreciated that the present framework is described in the context of taxis for the purposes of illustration only. The present framework may also be applied to other forms of vehicles that provide transportation services, such as buses, vans, cars, ships, water taxis, and so forth.

Central computer system 106 can be any type of computing device capable of responding to and executing instructions in a defined manner, such as a workstation, a server, a portable laptop computer, another portable device, a mini-computer, a mainframe computer, a storage system, a dedicated digital appliance, a device, a component, other equipment, or some combination of these. Central computer system 106 may include a central processing unit (CPU) 110, an input/output (I/O) unit 114, a memory module 112 and a communications card or device 116 (e.g., modem and/or network adapter) for exchanging data with a network (e.g., local area network (LAN) or a wide area network (WAN)). It should be appreciated that the different components and sub-components of the computer system 106 may be located on different machines or systems.

Central computer system 106 may be communicatively coupled to one or more other computer systems or devices via the network. For instance, computer system 106 may further be communicatively coupled to one or more data repositories 118. Alternatively, data repository 118 may be implemented within computer system 106. Data repository 118 may be, for example, any database (e.g., relational database, in-memory database, etc.), an entity (e.g., set of related records), or a data set included in a database. In some implementations, data repository 118 serves to store vehicle operation data, station location data, and so forth. Data repository 118 may include a high efficiency database with low seek time to enable the central system 106 to perform substantially in real time.

In some implementations, an in-memory database is implemented as the data repository 118. In-memory databases allow seamless access to and propagation of high volumes of data in real time. Parallel processing may further be achieved by using a multicore processor 110 in conjunction with the in-memory database 118. The in-memory database 118 is a database management system that relies primarily on a system's main memory for efficient computer data storage. More particularly, the data in the in-memory database resides in volatile memory and is not persistently stored on a hard drive, thereby allowing the data to be instantly accessed and scanned at a speed of several megabytes per millisecond.

Memory module 112 of the central computer system 106 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by CPU 110. As such, the computer system 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 of the central computer system 106 includes a data module 122 and a planning module 124. Data module 122 may include a set of function modules or programs designed to collect incoming vehicle operation data from different vehicle data devices 158. Data module 122 may aggregate the incoming data from different vehicle data devices 158 before sending the data to the planning module 124. Planning module 124 may include a set of function models or programs designed to use the vehicle operation data to optimally allocate vehicle stations and/or standby vehicles in a region of interest.

Central computer system 106 may act as a server and operate in a networked environment using logical connections to one or more client devices 156 and one or more vehicle data devices 158. Client device 156 may serve as user interface to enable a planner (or other user) to send and receive information (e.g., processing results) from computer system 106. Vehicle data device 158 may serve to collect and transmit vehicle operation data (e.g., location of vehicle, patient status, time stamp, etc.) to computer system 106 for processing. In some implementations, such vehicle data device include mobile devices (e.g., smart phone, tablet computer, laptop communication device, etc.). Other types of vehicle data devices are also useful.

Vehicle data device 158 may be physically installed or present on-board the vehicle and serves as a communication interface between the vehicle driver and the planning module 124. Vehicle data device 158 may include components similar to a computer system, such as an input device for receiving user input (e.g., touch screen, keypad, speech recognition component, etc.), an output device for displaying a user interface, a communications card, non-transitory memory, a processor, and so forth. The vehicle data device 158 may further include a telematics device capable of collecting substantially real-time vehicle information, such as current location of the vehicle, on-board status of passenger, etc. Exemplary telematics devices include, but are not limited to, global positioning systems (GPS), electronic, electromechanical, electromagnetic and/or electromechanical sensors, and so forth. Vehicle data device 158 may stream real-time vehicle operation data to the central computer system 106 at regular time intervals (e.g., 10 seconds). Such real-time vehicle information may be streamed to the planning module 124 via, for example, a 3G network or any other types of suitable network. In some implementations, the vehicle operation data is stored in data repository 118.

Figure 2:
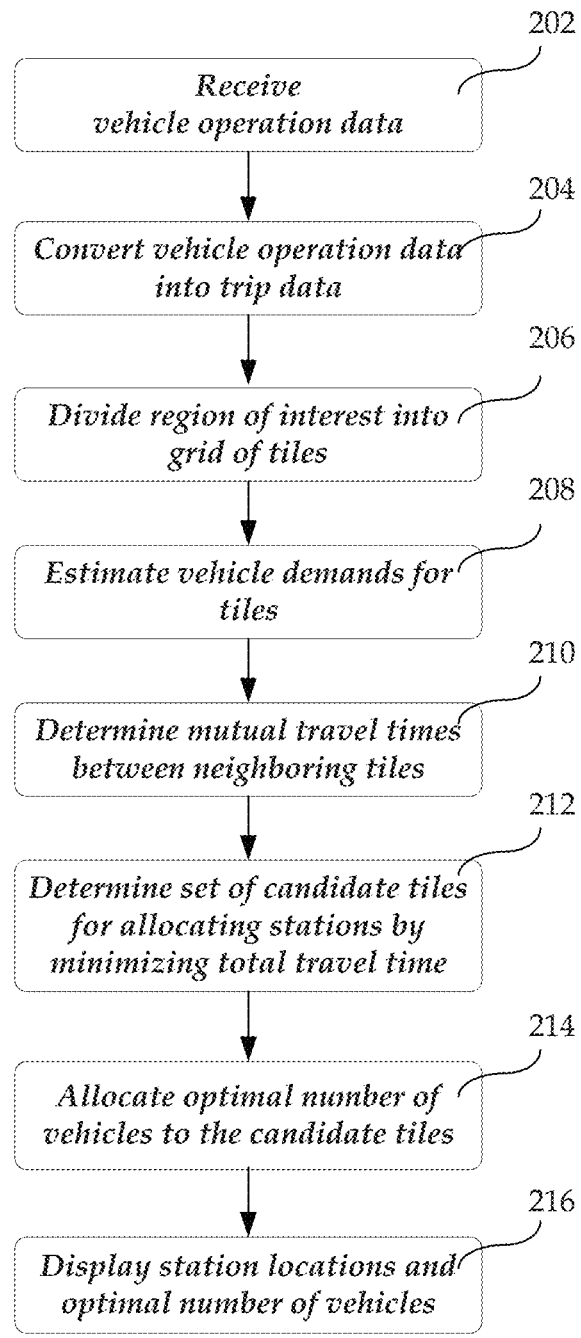
FIG. 2 shows an exemplary method of optimally allocating vehicle stations.

FIG. 2 shows an exemplary method 200 of optimal allocation. The process 200 may be performed automatically or semi-automatically by the central computer system 106, as previously described with reference to FIG. 1. It should be noted that in the following discussion, reference will be made, using like numerals, to the features described in FIG. 1.

At 202, data module 122 receives vehicle operation data from one or more vehicle data devices 158. Each vehicle data device 158 is on board a vehicle, such as a taxi, bus, van, car, ship, water taxi, or any other transportation service vehicle servicing a region of interest (ROI). The ROI is a geographical area identified for planning locations of vehicle stations (e.g., taxi stands) for pick-up and/or drop-off of passengers. Exemplary ROIs include a town, city, district, precinct, state, country or any other predefined geographical area. Data module 122 may collect the vehicle operation data records at, for example, regular time intervals (e.g., 30 seconds). The vehicle operation data contains trajectory records of vehicle fleets with an active passenger status indicating whether one or more passengers are on board.

FIG. 3a shows exemplary data records 300 in the vehicle operation data. In this illustration, the vehicle operation data comprises taxi operation data. Each row corresponds to a data record. For illustration purposes, the data records 300 are associated with (and received from) one taxi data device identifier or ID (DEVID=1051847361) on board a taxi. It should be appreciated that the data records 300 may also be received from multiple vehicle data devices on board multiple vehicles. The time-ordered data records for one vehicle data device ID may be referred to as the "trajectory data" of that vehicle.

FIG. 3b shows an exemplary data structure 302 of a vehicle operation data record. As shown, the data record may include a vehicle data device ID 304, location coordinates 306 (e.g., GPS longitude and latitude value), a time stamp 308 with a passenger status 310. The passenger status 310 may be set to inactive state '0' to indicate that no passengers are on board the vehicle, or active state '1' to indicate that at least one passenger is on board the vehicle.

Returning to FIG. 2, at 204, data module 122 converts the vehicle operation data into trip data. The trip data describes separate trips that are made with an active passenger status. The trip data may include, for example, the origin (or passenger pick-up) location and destination (or passenger drop-off) location for each trip, travel time duration of each trip, etc. Data module 122 may convert the vehicle operation data into trip data by extracting relevant trip data and organizing it into formatted data before routing it to the planning module 124. The trip data may also be stored in the data repository 118 for future retrieval.

Data module 122 may extract the trip data by using the passenger status (PASSENGER_STATE) to segment trajectory data associated with one vehicle data device (or vehicle) into separate trips. Each trip includes time-ordered data records with passenger status indicating a passenger is on board the associated vehicle. For example, the data records may consist of data records with PASSENGER_STATE being consecutive 1's. When the PASSENGER_STATE changes in the vehicle's trajectory data, it indicates a passenger is getting on (0→1) or off (1→0) the vehicle at the changing point, with the corresponding GPS locations being an origin and a destination of that trip.

Figure 4A:
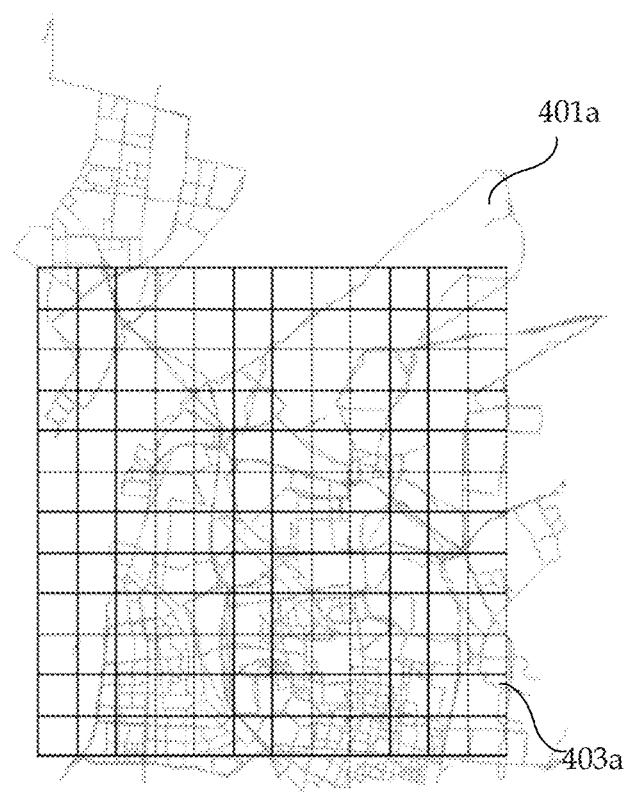
FIG. 4a shows an exemplary region of interest (ROI)
Figure 4B:
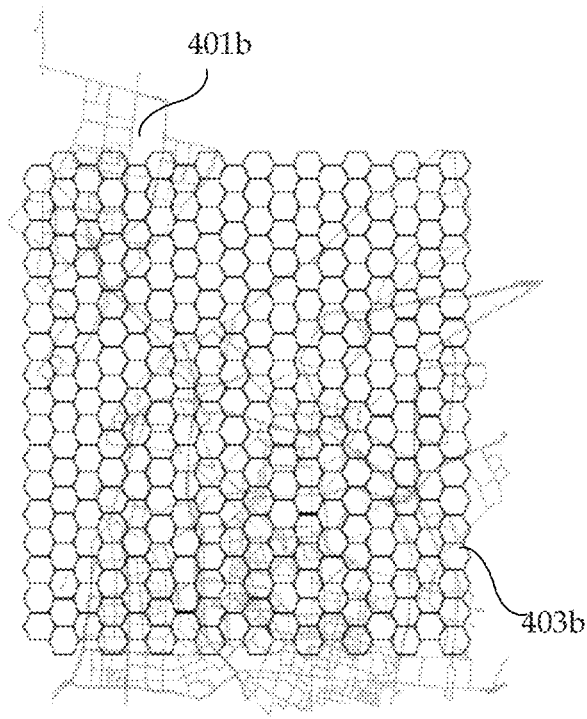
FIG. 4b shows another exemplary ROI.

At 206, planning module 124 divides the ROI into a grid of tiles. FIG. 4a shows an exemplary ROI 401a. ROI 401a is divided into a lattice grid structure 403a with regular tiling. In other words, ROI 401a is covered by a set of non-overlapping regular tiles, each of which covers a small area of the ROI 401a. The region covered by i-th tile is denoted as $\Omega_i \subseteq \mathbb{R}^2$, for i=1, . . . , N, wherein N is the total number of tiles. The area of each region may be, for example, 500 m×500 m. As shown, the tiles of the grid structure 403a are square. The tiles of the grid may also be any other shape, such as triangle, hexagon or other polygons. FIG. 4b shows another exemplary ROI 401b. ROI 401b is divided into a lattice grid structure 403b with regular non-overlapping tiles that are hexagonal.

Returning to FIG. 2, at 208, planning module 124 estimates the vehicle demands for the tiles in the region of interest. Each tile is associated with properties characterizing demand for vehicles servicing the area covered by the tile. The tile-wise vehicle demands may be estimated from the trip data by extracting the origin (or pick-up) locations for all trips over the ROI for a given time period, and determining the number of trips with origin locations situated within each tile (i.e., accumulating within-tile origin-location counts for each tile).

In some implementations, the demand $d_i$ of the i-th tile may be estimated as follows:

$$d_i = \log \frac{c_i}{\sum_{i=1}^{N} c_i} \quad (1)$$

wherein $c_i$ denotes the number of getting-on events within tile i, and N is the total number of tiles. The logarithmic function (1) is shown for illustration purposes, and it should be appreciated that other monotonic functions may also be used.

The number of getting-on events $c_i$ within tile i, may be determined based on the origin locations extracted from the trip data. Alternatively, or in combination thereof, the value of $c_i$ may be manually specified to reflect the user's selection of a confidence value on the relative importance for the tile i to be assigned a vehicle station. For example, if the tile covers a region where a taxi station s deemed inappropriate (e.g., in an area with heavy traffic) by the city planner, $c_i$ for that tile can be set to zero. On the other hand, if the city planner prefers to assign a taxi station next to a specific location (e.g., hotel, airport, stadium, train station, ferry terminal, etc.), $c_i$ for the tile with that location may be set to the maximum possible value $$\max_i c_i.$$

At 210, planning module 124 determines the mutual travel times between neighboring tiles based on the trip data. The mutual travel time ($w_{ij}$) from tile i to tile j, given that tiles i and j are neighbors (or adjacent to each other), is determined by averaging over many trips with an active passenger status, the travel times of vehicles traveling between these two tiles, as follows:

$$w_{ij} = \begin{cases} \dfrac{\sum_{v=1}^{N_{ij}} \Delta t_{ij}^v}{N_{ij}} & \text{if } i, j \text{ are neighbors} \\ 0 & \text{otherwise} \end{cases} \quad (2)$$

wherein $N_{ij}$ denotes the total number of trips originating from tile i and ending in tile j, and $\Delta t_{ij}^v$ is the estimated travel time from tile i to neighboring tile j for the v-th trip.

In some implementations, the estimated travel time $\Delta t_{ij}^v$ is estimated by the following:

$$\Delta t_{ij}^v = \max_{x(t_k^v) \in \Omega_j, x(t_l^v) \in \Omega_i, t_k^v > t_l^v} t_k^v - t_l^v \quad (3)$$

wherein $\Omega_j$ is the set of all locations in tile j, $\Omega_i$ is the set of all locations in tile i, $t_k^v$ is the k-th (or last) time point in trip v and $x(t_k^v)$ denotes the corresponding location in tile j, $t_l^v$ is the l-th (or first) time point in trip v and $x(t_k^v)$ denotes the corresponding location in tile i. In other words, $\Delta t_{ij}^v$ is estimated by determining the longest time taken to travel from tile i to tile j in a single trip, which takes into account the situation where the vehicle is associated with multiple data records captured at multiple locations and time stamps within tile i or tile j. Alternatively, $\Delta t_{ij}^v$ may be determined by averaging travel times from tile i to tile j for the v-th trip.

Figure 4C:
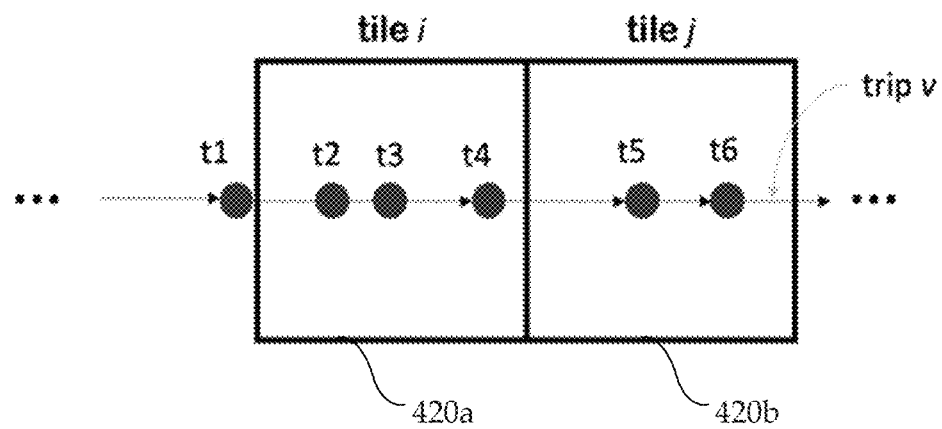
FIG. 4c illustrates the determination of the estimated travel time from one tile to a neighboring tile for trip v.

FIG. 4c illustrates the determination of the estimated travel time $\Delta t_{ij}^v$ between tile i (420a) to neighboring tile j (420b) for trip v. A map tile (420a or b) is typically from size 500 m×500 m, which may be large enough to enclose multiple data records captured at different locations and time stamps (e.g., t2, t3 and t4 in tile i; t5 and t6 in tile j) for a single trip crossing these tiles. There may be different ways of defining the estimated travel time from tile i to tile j for the trip v (i.e. $\Delta t_{ij}^v$). In some implementations, the maximum time difference between time stamps in the two tiles (i.e. t6−t2) is used (as shown in Equation 3). Alternatively, the average time may be used to define the mutual travel time. In the example shown, the average time may be defined as ((t6−t2)+(t6−t3)+(t6−t4)+(t5−t2)+(t5−t3)+(t5−t4))/6.

The matrix $W=[w_{ij}]$ is the adjacency matrix of a weighted directed graph, wherein each node corresponds to a tile. Only neighboring node pairs are connected by edges in the graph, with the weight of each edge given by the neighborhood travel time (or between-tile travel time). Therefore, for any tile pair i and j, i≠j (tiles i and j need not be neighboring tiles) the between-tile travel time $s_{ij}^0$ may be determined using a minimum-path finding method (e.g., Dijkstra method), formally given by, $$s_{ij}^0 = \text{MinPathLength}(i,j|W) \quad (4)$$

It should be appreciated that the between-tile travel time $s_{ij}^0$ may be defined between tiles that are not necessarily adjacent (or neighboring) to each other.

At 212, planning module 124 determines a set of candidate tiles for allocating stations by minimizing total travel time. A single station may be allocated to each candidate tile. The total travel time may be determined by summing the travel times from a given candidate station to all tiles within a service region. The service region associated with a station refers to tiles that are serviced by the station, which may be determined by a clustering technique, such as affinity propagation, k-means, k-medoids, etc. The goal of the clustering technique is to find the most optimal tile-station configuration with the minimal "total travel time".

More particularly, affinity propagation (AP) is a prototype-based clustering procedure initially proposed by Frey et al. See, for example, Frey, Brendan J. and Dueck, Delbert; "Clustering by Passing Messages Between Data Points"; Vol. 315, pp. 972-976, October 2006, which is herein incorporated by reference. It selects, among a set of data points, a number of data prototypes (also known as exemplars) and assigns all of the rest of the data points to the identified prototypes to form clusters.

In AP, each data point carries a quantity, preference, to characterize its tendency to be selected as the prototype. The preference for k-th data point may be denoted by $s_{kk}$. Similarity between data point pairs, denoted by $s_{ik}$, indicates how well the data point k is suited to be the prototype of data point i, for i≠k. Taking preference and similarity as inputs, AP maximizes the sum of total within-cluster similarities (i.e., similarity between data points and the corresponding cluster center) and the prototype preferences. The AP procedure iteratively updates two messages ($r_{ik}$ and $a_{ik}$) between data points i and j as follows, $$r_{ik} \leftarrow s_{ik} - \max_{k' \neq k} a_{ik'} + s_{ik'} \quad (5)$$

$$a_{ik} \leftarrow \min\{0, r_{kk} + \Sigma_{i' \notin \{i,k\}} \max\{0, r_{i'k}\}\} \quad (6)$$

$$a_{kk} \leftarrow \Sigma_{i' \neq k} \max\{0, r_{i'k}\} \quad (7)$$

Wherein messages $r_{ik}$ and $a_{ik}$ are responsibility and availability messages respectively of the i-th tile to k-th tile, $r_{kk}$ is the responsibility message of the k-th tile to the k-th tile, $r_{i'k}$ is the responsibility message of the i'-th tile to the k-th tile, $s_{ik'}$ is the similarity of the i-th tile to the k'-th tile, and $a_{ik}$ is initialized with zeroes. At convergence, a subset of the given data points emerges as the prototypes (i.e., cluster centers) and each one of the rest of the data points is assigned to one prototype.

In some implementations, standby vehicle stations are allocated to a set of tiles, such that the overall travel time from station-tiles to all the other tiles is minimized. If each tile is considered as a data point, the AP technique may be performed for the minimization with minor modifications. Specifically, the tile-wise vehicle demand, $d_i$ may be considered as preference for the tile to be a station candidate; the negative between-tile traveling times $s_{ij}^0$ (weighted by absolute tile-wise demand) are considered as similarities for all tile pairs. The input ($s_{ij}$) to the weighted AP procedure may then be defined as follows:

$$s_{ij} = \begin{cases} -\dfrac{s_{ji}^0}{|d_i|} & i \neq j \\ \lambda \cdot d_j & i = j \end{cases} \quad (8)$$

wherein $d_i$ is the demand estimated for the i-th tile, $d_j$ is the demand estimated for the j-th tile, $s_{ji}^0$ is the travel time from tile j to tile i, and λ is an adjustable parameter. $s_{ij}$ may be substituted as $s_{ik}$ in Equation (5). By adjusting the parameter λ, it is possible to obtain optimal configurations with various numbers of candidate stations (higher λ generates fewer candidate stations). At convergence, for each λ value, a set of tiles may be selected, among all map tiles, as candidate vehicle station locations. Each of the rest of the map tiles is assigned to one candidate vehicle station to form a service region served by that candidate vehicle station.

The present implementation of weighted AP for allocating vehicle stations is capable of providing a variety of optimal configurations with different numbers of candidate tiles according to the adjustable parameter λ. The user planner) may then select the configuration that best balances resources and response time to the vehicle request. For example, response time may be decreased by introducing more standby vehicle stations within the ROT. In order to facilitate the selection, an allocation planning curve (APC) may be provided to represent the optimal configurations and quantify trade-offs between number of standby stations and response time.

The APC is generated by running weighted AP for a range of λ values ($\lambda_k$ for k=1, ..., K). On one hand, each λ value ($\lambda_k$) gives an optimal candidate station configuration and the number of stations $N_k$. On the other hand, for each candidate station configuration, a statistical value may be generated to characterize travel time to a map tile from its assigned station location for all map tiles. For example, the statistical value may be the median travel time $T_k$ as follows:

$$T_k = \underset{i=1,\ldots,N}{\text{median}}\, s_{e_i^k i}^0 \quad (9)$$

wherein $e_i^k$ is the candidate service station assigned to map tile i, $\lambda=\lambda_k$, N is the total number of tiles and $s_{e_i^k i}^0$ is the travel time to the map tile i from its respective candidate station. For all $\lambda_k$, k=1, ..., K, various pairs ($N_k$, $T_k$) may be plotted to generate the APC.

Figure 5:
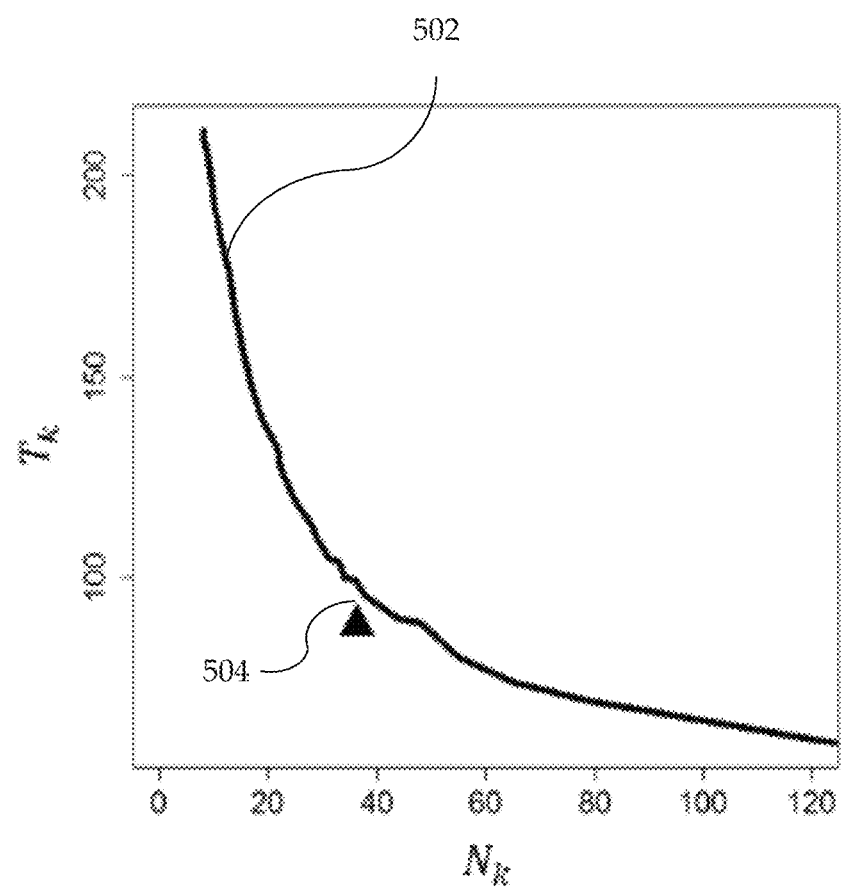
FIG. 5 shows an exemplary allocation planning curve (APC)

FIG. 5 shows an exemplary allocation planning curve (APC) 502. The vertical and horizontal axes of the APC 502 represent the median travel time ($T_k$) and the number of stations ($N_k$) respectively for a particular $\lambda_k$. Normally, the $\lambda_k$ (and the corresponding vehicle configuration) that corresponds to the elbow point 504 of the APC 502 can be considered as the most cost effective candidate taxi station configuration, since introducing more taxi stations will not decrease the overall response time dramatically. More formally, the elbow point 504 may be defined as the point on APC 502 next to the maximum-curvature point of the best fitting—in least-squares sense—monotonic decreasing curve to APC. It should be appreciated that the user (or planner) can use the APC to investigate the effect of different numbers of vehicle stations on response time for different values of $\lambda_k$, and choose the most desired configuration.

Returning to FIG. 2, at 214, planning module 124 allocates the optimal number of standby vehicles to the stations. The optimal number of standby vehicles may be allocated to each standby station for a given number of vehicles available. The total demand within a service region of a vehicle station may be used to estimate the proportion of vehicles that are to be assigned to this region. Specifically, the fraction of vehicles $n_t$ that are to be assigned to a vehicle station t may be given by, $$n_t = \frac{\sum_{\{j:e_j=t\}} c_j}{\sum_{i=1}^{N} c_i} \quad (10)$$

wherein $c_i$ and $c_j$ represent the number of getting-on events within tiles i and j respectively (see, e.g., Equation (1)), $e_j$ represents the candidate service station for tile j, the expression $\{j:e_j=t\}$ represents the set of all tiles belonging to the service station t (i.e. the station located at tile t, since one station maps to only one map tile), and N is the total number of tiles. The number of vehicles may be estimated by rounding up or down the value of $n_tT$, where T is the total number of vehicles available.

At 216, the station locations and optimal number of vehicles at the stations are presented or displayed. In some implementations, the station locations and optimal number of vehicles at the stations are displayed by the planning module 124 on system 106 via a user interface (e.g., map in a graphical user interface). Alternatively, or additionally, the station locations and optimal number of vehicles at the stations are displayed at the client device 156 for viewing via a user interface by, for example, the planner.

Figure 6:
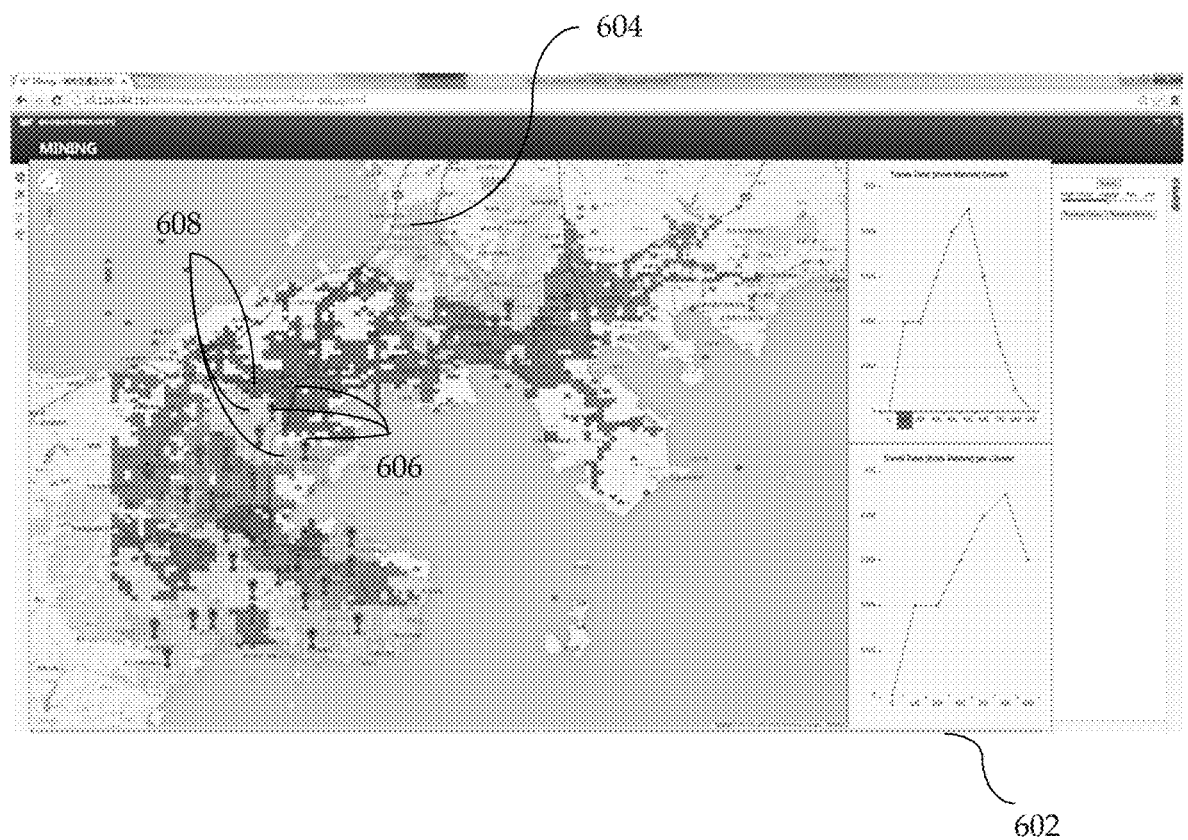
FIG. 6 shows an exemplary user interface view.

FIG. 6 shows an exemplary user interface view 602. A map 604 of the region of interest is displayed. Markers 606 indicate the optimal locations of taxi stations. Different colors (or shadings) are used to indicate the service areas 608 corresponding to the station locations 606.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:
1. A system for optimal allocation, comprising:
a non-transitory memory device for storing computer-readable program code; and
a processor in communication with the memory device, the processor being operative with the computer-readable program code to perform the steps of
receiving vehicle operation data from one or more vehicle data devices that service a region of interest, wherein the one or more vehicle data devices stream real-time vehicle operation data to a central computing system, wherein the vehicle operation data is stored in vehicle operation records which are instantly accessible in volatile memory of an in-memory database for high speed scanning,
converting the vehicle operation data records into trip data by segmenting the vehicle operation data into separate trips by using a passenger status in the vehicle operation data, wherein each of the separate trips includes an origin location, a destination location and a travel time duration,
estimating, based at least in part on the trip data, vehicle demands for multiple tiles of the region of interest,
determining, based at least in part on the trip data, mutual travel times between neighboring tiles within the region of interest,
determining, based on the mutual travel times and vehicle demands, a set of candidate tiles among the multiple tiles for allocating vehicle stations by performing affinity propagation;
allocating an optimal number of vehicles to at least one of the candidate tiles, and
displaying, via a user interface, the optimal number of vehicles on a map:
wherein performing the affinity propagation comprises using $s_{ij}$ as input to the affinity propagation, wherein $s_{ij}$ is defined as follows:

$$s_{ij} = \begin{cases} -\frac{s_{ji}^0}{|d_i|} & i \neq j \\ \lambda \cdot d_j & i = j \end{cases}$$

wherein $d_i$ is the demand estimated for the i-th tile, $d_j$ is the demand estimated for the j-th tile, $s_{ji}^0$ the travel time from tile j to tile i, and $\lambda$ is an adjustable parameter.

2. The system of claim 1 wherein the vehicle operation data comprises taxi operation data.

3. The system of claim 1 wherein the vehicle operation data comprises time ordered data records, wherein each of the time ordered data records stores location coordinates and a passenger status.

4. A computer-implemented method, comprising:
receiving, by a computer system, vehicle operation data from one or more vehicle data devices servicing a region of interest, wherein the vehicle data devices stream real-time vehicle operation data to the computing system, wherein the vehicle operation data is stored in vehicle operation records which are instantly accessible in volatile memory of an in-memory database for high speed scanning;
converting, by the computer system, the vehicle operation data records into trip data by segmenting the vehicle operation data into separate trips by using a passenger status in the vehicle operation data, wherein each of the separate trips includes an origin location, a destination location and a travel time duration;
estimating, by the computer system based at least in part on the trip data, vehicle demands for multiple tiles of the region of interest;
determining, by the computer system based at least in part on the trip data, mutual travel times between neighboring tiles of the region of interest;

determining, by the computer system based on the mutual travel times and the vehicle demands, at least one candidate tile among the multiple tiles for allocating a vehicle station by minimizing total travel time by performing affinity propagation; and presenting, via a user interface, the candidate tile for allocating the vehicle station;

wherein performing the affinity propagation comprises using $s_{ij}$ as input to the affinity propagation, wherein $s_{ij}$ is defined as follows:

$$s_{ij} = \begin{cases} -\dfrac{s_{ji}^0}{|d_i|} & i \neq j \\ \lambda \cdot d_j & i = j \end{cases}$$

wherein $d_i$ is the demand estimated for the i-th tile, $d_j$ is the demand estimated for the j-th tile, $s_{ji}^0$ is the travel time from tile j to tile i, and $\lambda$ is an adjustable parameter.

5. The method of claim 4 wherein converting the vehicle operation data into the trip data comprises segmenting the vehicle operation data into separate trips by using a passenger status in the vehicle operation data, wherein each of the separate trips includes an origin location, a destination location and a travel time duration.

6. The method of claim 4 further comprises dividing the region of interest into a grid of the multiple tiles, wherein the multiple tiles are square, triangular or hexagonal tiles.

7. The method of claim 4 wherein estimating the vehicle demands comprises:

extracting, from the trip data, origin locations for all trips over the region of interest for a given time period; and estimating at least one of the vehicle demands for at least one of the tiles by determining a number of trips with the origin locations situated within the tile.

8. The method of claim 4 wherein estimating the vehicle demands comprises estimating at least one of the vehicle demands for at least one of the tiles by determining a logarithmic function of a number of getting-on events within the tile.

9. The method of claim 8 further comprising determining the number of getting-on events from the trip data.

10. The method of claim 8 further comprising determining the number of getting-on events from a user selection of a confidence value.

11. The method of claim 4 wherein determining the mutual travel times between neighboring tiles comprises averaging travel times of vehicles traveling between two neighboring tiles over multiple trips with an active passenger status.

12. The method of claim 4 wherein determining the set of candidate tiles further comprises performing a clustering technique.

13. The method of claim 4 wherein determining the at least one candidate tile comprises determining different sets of candidate tiles according to an adjustable parameter.

14. The method of claim 13 further comprises generating an allocation planning curve that represents the different sets of candidate tiles and quantifies trade-offs between number of candidate tiles and response time.

15. The method of claim 13 further comprising determining an optimal number of vehicles to be distributed to at least one of the candidate tiles.

16. A non-transitory computer-readable medium having stored thereon program code, the program code executable by a computer to:

extract trip data from vehicle operation data received from one or more vehicle data devices servicing a region of interest, wherein the one or more vehicle data devices stream real-time vehicle operation data to a central computing system, wherein the vehicle operation data is stored in vehicle operation records which are instantly accessible in volatile memory of an in-memory database for high speed scanning;

estimate, based at least in part on the trip data, vehicle demands for multiple tiles of the region of interest;

determine, based at least in part on the trip data, mutual travel times between neighboring tiles of the region of interest;

determine, based on the mutual travel times and the vehicle demands, a set of candidate tiles among the multiple tiles for allocating vehicle stations by minimizing total travel time by performing affinity propagation; and present, via a user interface, the set of candidate tiles for allocating the vehicle stations;

wherein performing the affinity propagation comprises using $s_{ij}$ as input to the affinity propagation, wherein $s_{ij}$ is defined as follows:

$$s_{ij} = \begin{cases} -\dfrac{s_{ji}^0}{|d_i|} & i \neq j \\ \lambda \cdot d_j & i = j \end{cases}$$

wherein $d_i$ is the demand estimated for the i-th tile, $d_j$ is the demand estimated for the j-th tile, $s_{ji}^0$ is the travel time from file j to tile i, and $\lambda$ is an adjustable parameter.

17. The non-transitory computer-readable medium of claim 16, wherein the program code is executable by the computer to further determine the set of candidate tiles by performing a clustering technique.

18. The non-transitory computer-readable medium of claim 16, wherein the program code is executable by the computer to determine an optimal number of vehicles to be distributed to at least one of the candidate tiles.

* * * * *